Figure 1:
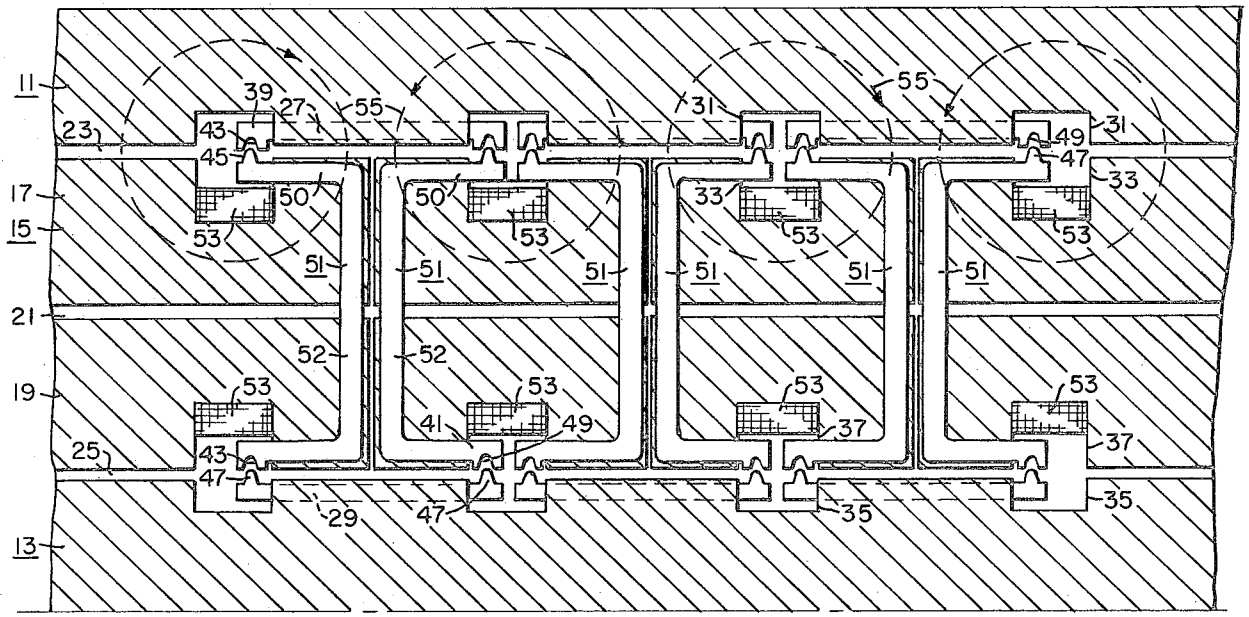
Figure 2:
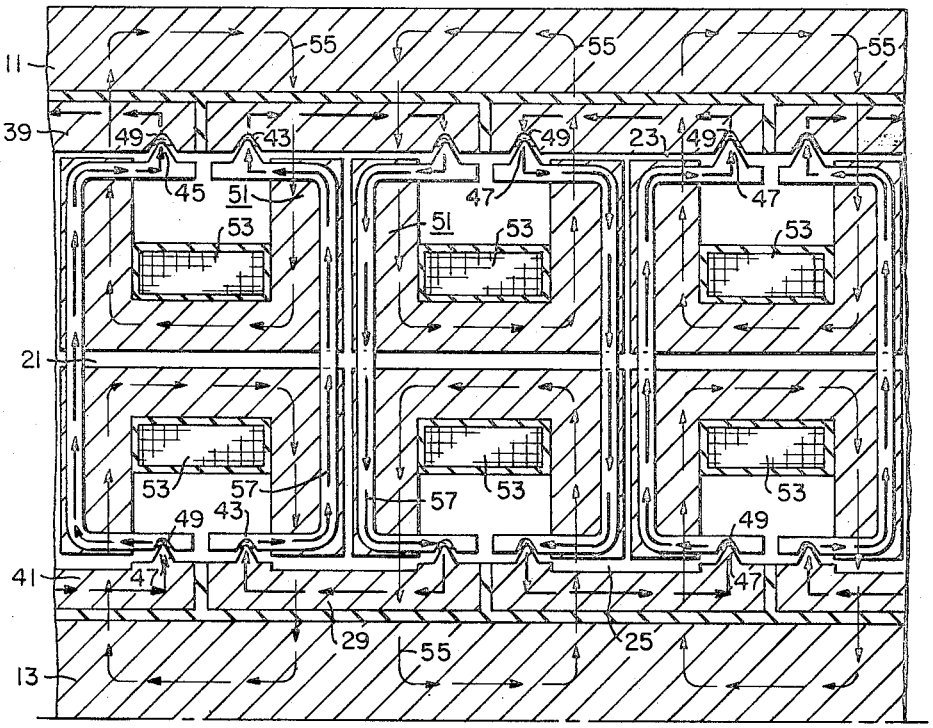
Figure 3:
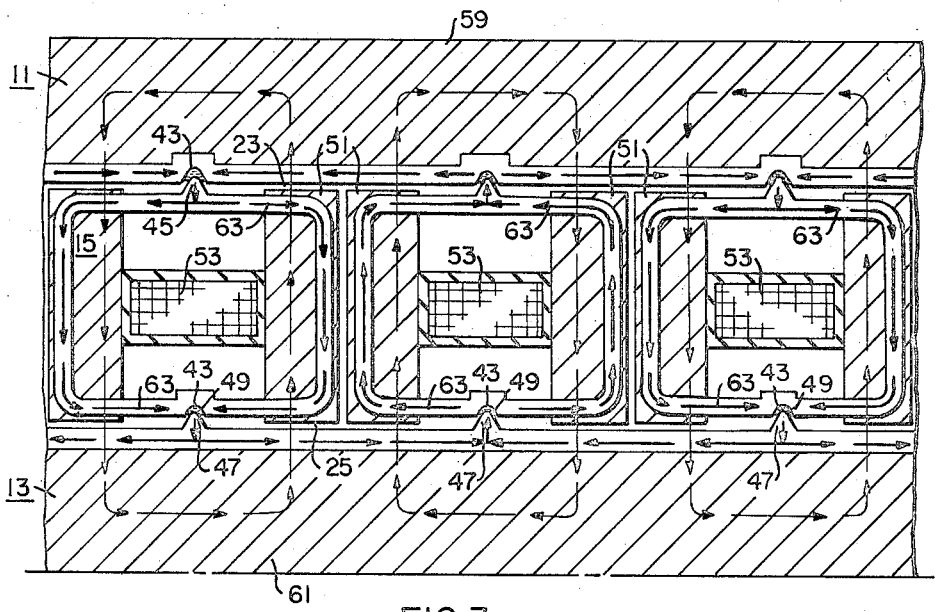

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 2, 1974

921 O.G. 10

T921,004
SEGMENTED MAGNET HOMOPOLAR TORQUE CONVERTER

Cecil J. Mole, Monroeville, and William C. Brenner, Pittsburgh, Pa., assignors to Westinghouse Electric Corporation, Pittsburgh, Pa.

Filed Mar. 30, 1973, Ser. No. 346,534
Int. Cl. H02k *31/00*
U.S. Cl. 310—178
2 Sheets Drawing. 3 Pages Specification

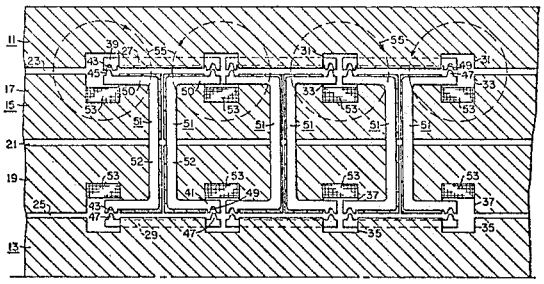

A homopolar motor and a homopolar generator are concentric and radially displaced from one another to provide a torque conversion arrangement. The motor and generator circuits are internally connected by stationary conductors to provide a closed loop current path.

SEGMENTED MAGNET HOMOPOLAR TORQUE CONVERTER

Filed March 30, 1973 2 Sheets-Sheet 1

SEGMENTED MAGNET HOMOPOLAR TORQUE CONVERTER

Filed March 30, 1973 2 Sheets-Sheet 2